(12) United States Patent
Yamazaki et al.

(10) Patent No.: US 9,944,289 B2
(45) Date of Patent: Apr. 17, 2018

(54) SYSTEM AND METHOD FOR CONTROLLING A TRANSMISSION GEAR SHIFT (71) Applicant: Ford Global Technologies, LLC, Dearborn, MI (US)

(72) Inventors: Mark Steven Yamazaki, Canton, MI (US); Bernard D. Nefcy, Novi, MI (US); Christopher Alan Lear, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 14/934,804

(22) Filed: Nov. 6, 2015

(65) Prior Publication Data
US 2017/0129493 A1   May 11, 2017

(51) Int. Cl.
| | |
|---|---|
| *B60W 30/18* | (2012.01) |
| *B60K 6/365* | (2007.10) |
| *B60W 10/08* | (2006.01) |
| *B60W 10/184* | (2012.01) |
| *B60W 20/00* | (2016.01) |
| *B60K 6/387* | (2007.10) |
| *B60K 6/547* | (2007.10) |
| *B60W 10/11* | (2012.01) |
| *B60W 20/30* | (2016.01) |

(Continued)

(52) U.S. Cl.
CPC ....... *B60W 30/18127* (2013.01); *B60K 6/365* (2013.01); *B60K 6/387* (2013.01); *B60K 6/547* (2013.01); *B60W 10/08* (2013.01); *B60W 10/11* (2013.01); *B60W 10/184* (2013.01); *B60W 20/00* (2013.01); *B60W 20/14* (2016.01); *B60W 20/30* (2013.01); *B60K 2006/4825* (2013.01); *B60W 2510/1005* (2013.01); *B60W 2510/12* (2013.01); *B60W 2710/083* (2013.01); *B60W 2710/182* (2013.01); *B60W 2720/30* (2013.01); *B60Y 2200/92* (2013.01); *B60Y 2300/18125* (2013.01); *B60Y 2300/60* (2013.01); *B60Y 2300/89* (2013.01); *Y02T 10/6252* (2013.01); *Y10S 903/91* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 2003/0168266 A1* | 9/2003 | Sasaki | B60K 6/48 180/65.25 |
| 2007/0192010 A1* | 8/2007 | Carlstrom | B60T 1/10 701/70 |

(Continued)

Primary Examiner — Justin Holmes
(74) Attorney, Agent, or Firm — David B. Kelley; Brooks Kushman P.C.

(57) ABSTRACT

A system and method for controlling a transmission gear shift during a braking event in a vehicle having an electric motor and friction brakes both operable to brake the vehicle includes the step of reducing friction braking to increase wheel torque during the braking event. The braking event includes both friction braking and regenerative braking. The reduction in friction braking to increase the wheel torque is based at least in part on a reduction in the wheel torque resulting from a change in gear ratio of a step-ratio transmission during the transmission gear shift.

18 Claims, 5 Drawing Sheets (51) Int. Cl.
*B60W 20/14* (2016.01)
*B60K 6/48* (2007.10)

(56) References Cited

U.S. PATENT DOCUMENTS

| | | | |
|---|---|---|---|
| 2008/0314661 A1* | 12/2008 | Soliman | B60K 6/442 |
| | | | 180/65.245 |
| 2009/0150035 A1* | 6/2009 | Soliman | B60K 6/365 |
| | | | 701/54 |
| 2010/0304922 A1* | 12/2010 | Ohkubo | B60K 6/48 |
| | | | 477/4 |
| 2012/0234133 A1* | 9/2012 | Ikegami | B60K 6/48 |
| | | | 74/661 |
| 2013/0076113 A1 | 3/2013 | Pihl et al. | |
| 2013/0238208 A1 | 9/2013 | Hirata | |
| 2014/0375115 A1 | 12/2014 | Ajiro | |
| 2015/0038296 A1* | 2/2015 | Toyota | B60W 20/00 |
| | | | 477/92 |
| 2015/0087475 A1 | 3/2015 | Dai et al. | |
| 2015/0203106 A1 | 7/2015 | Zhao et al. | |

* cited by examiner

SYSTEM AND METHOD FOR CONTROLLING A TRANSMISSION GEAR SHIFT

TECHNICAL FIELD

The present disclosure relates to a system and method for controlling a transmission gear shift in a vehicle.

BACKGROUND

Electric vehicles, hybrid electric vehicles (HEV's), plug-in hybrid electric vehicles (PHEV's) and other vehicles that utilize an electric machine, such as an electric motor, may be configured to use the electric machine to provide regenerative braking to at least assist in stopping the vehicle. Regenerative braking may provide a number of advantages over using a friction braking system exclusively. For example, the use of regenerative braking, whereby an electric motor provides negative torque to the vehicle wheels, reduces wear on the friction elements of the friction braking system. In addition, during regenerative braking, the motor may function as a generator, producing electricity that may be used immediately or stored in a storage device, such as a battery.

With a step-ratio transmission in a vehicle, there may be a torque hole during the ratio change of a downshift due to the change in inertia from a higher gear to a lower gear. In a conventional powertrain, this torque hole can be filled by reserving some engine torque via spark at the beginning of the shift, and then releasing the torque during the ratio change to fill-in for the inertia torque. In an HEV or PHEV powertrain, the downshift is typically executed during regenerative braking when the engine is off, so this solution may not be available. In at least some HEV and PHEV powertrains, the high voltage motor torque is operating with very negative torque—i.e., it is being used to charge an electrical storage device such as a battery—so to fill the torque hole during the shift, it is necessary to increase motor torque from a low negative value toward zero. This action reduces the amount of regenerative braking that can be captured, and reduces fuel economy. Additionally, it is not always possible to use the motor to fill in the torque hole. There are times when the motor has low headroom, such as a high battery state-of-charge (SOC) condition where the battery is full and cannot accept any more charge, or if the motor or battery is hot and the limits of electrical system have been reduced in an effort to cool them down. In these situations, the motor may not have enough capability to counter the inertia change in the shift, leading to inconsistent shift operation.

SUMMARY

At least some embodiments of the present invention include a method for controlling a transmission gear shift during a braking event in a vehicle having an electric motor and friction brakes both operable to brake the vehicle. The method includes the steps of reducing friction braking to increase wheel torque during the braking event, which includes both friction braking and regenerative braking, based at least in part on a reduction in the wheel torque resulting from a change in gear ratio of a step-ratio transmission during the transmission gear shift.

At least some embodiments of the present invention include a method for controlling a transmission gear shift during a braking event in a vehicle having an electric motor and friction brakes both operable to brake the vehicle. The method includes the steps of reducing friction braking on at least one axle of the vehicle to increase wheel torque during the braking event by an amount no greater than a reduction in the wheel torque resulting from the transmission gear shift.

At least some embodiments of the present invention include a system for controlling a transmission gear shift during a braking event in a vehicle having an electric motor and friction brakes both operable to brake the vehicle. The system includes a control system having at least one controller that is configured to reduce friction braking to increase wheel torque during the braking event based at least in part on a reduction in the wheel torque resulting from a change in gear ratio during the transmission gear shift.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
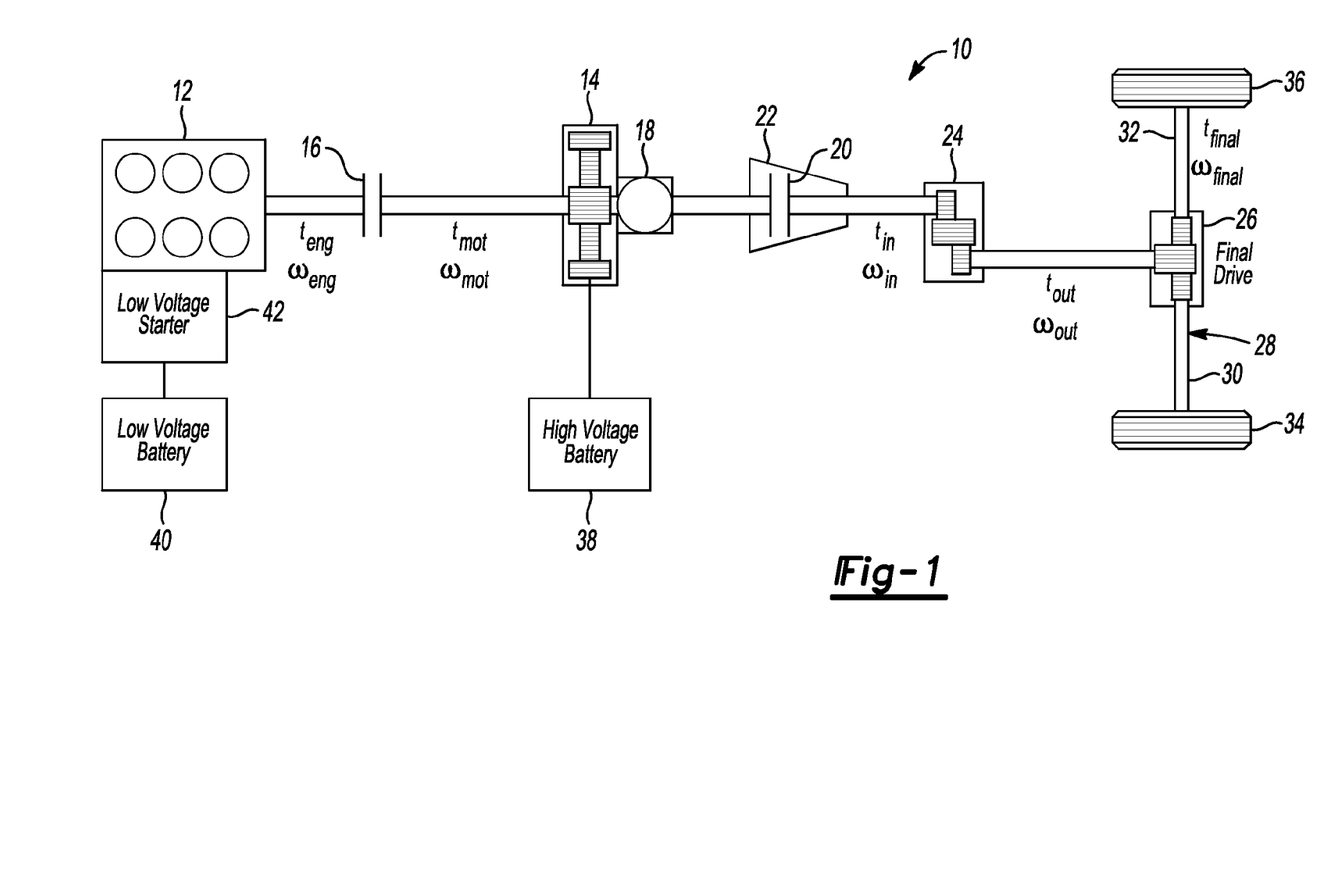
FIG. 1 is a schematic representation of a portion of a hybrid electric vehicle having a control system capable of implementing a method in accordance with embodiments of the present invention.

FIG. 1 shows a portion of a vehicle 10, which, as explained in more detail below, includes a control system capable of implementing a method in accordance with embodiments of the present invention. The vehicle 10 includes an engine 12 and an electric machine 14, which can operate as a motor to output torque and as a generator to receive torque and output electrical energy. Disposed between the engine 12 and the motor 14 is a disconnect clutch 16. A transmission pump 18, which in this embodiment is a mechanical pump, is connected to and powered by the motor 14. The pump 18, which may be the only transmission pump, or which may work in conjunction with an auxiliary pump, provides hydraulic output to operate the disconnect clutch 16 as well as a torque-converter bypass clutch 20, which works in conjunction with a torque converter 22.

The vehicle 10 also includes a transmission gearbox 24, which receives the output from the torque converter 22. The bypass clutch 20, torque converter 22 and transmission gearbox 24 may comprise a step-ratio transmission, which is distinguished from a continuous variable transmission (CVT). The transmission gearbox 24 provides an output to final drive gearing 26, which may be a differential, and provides torque to or receives torque from a driven axle 28—or more particularly half-axles 30, 32—and vehicle drive wheels 34, 36. Part of the vehicle electrical system includes a high-voltage battery 38, which may be used, for example, to provide electrical power to the motor 14. On the low-voltage side, a low-voltage battery 40 is connected to a low-voltage starter 42, which can be used to start the engine 12. It is understood that the high-voltage battery 38 and the low-voltage battery 40 are part of a larger electrical system, and may provide power to various electrical loads in the vehicle 10.

In FIG. 1, the outputs and the inputs of the various vehicle systems are also illustrated. For example, the engine 12 outputs both a torque ($t_{eng}$) and a speed ($\omega_{eng}$), and on the other side of the disconnect clutch 16 an input torque ($t_{mot}$) and input speed ($\omega_{mot}$) provide inputs into the motor 14. Alternatively, the motor torque and speed may represent outputs rather than inputs, and in such a case, the motor 14 can provide an input torque to the engine 12, for example, as an alternative to the low-voltage starter 42. When the motor 14 is being operated as a generator, it can provide electrical power to charge the high-voltage battery 38. The transmission gearbox 24 receives both a torque ($t_{in}$) and speed ($\omega_{in}$) input, which will be a function of the output of the engine 12, the position of the disconnect clutch 16, the output of the motor 14, and the operation of the bypass clutch 20 and torque converter 22. The output from the transmission gearbox 24 ($t_{out}$) and ($\omega_{out}$) is received by the differential gearing 26 and transmitted to the drive wheels 34, 36 through the axle 28, and represents the final torque ($t_{final}$) and speed ($\omega_{final}$) output. Alternatively, during regenerative braking, the drive wheels 34, 36 supply torque through the gearing and back to the motor 14.

Figure 2:
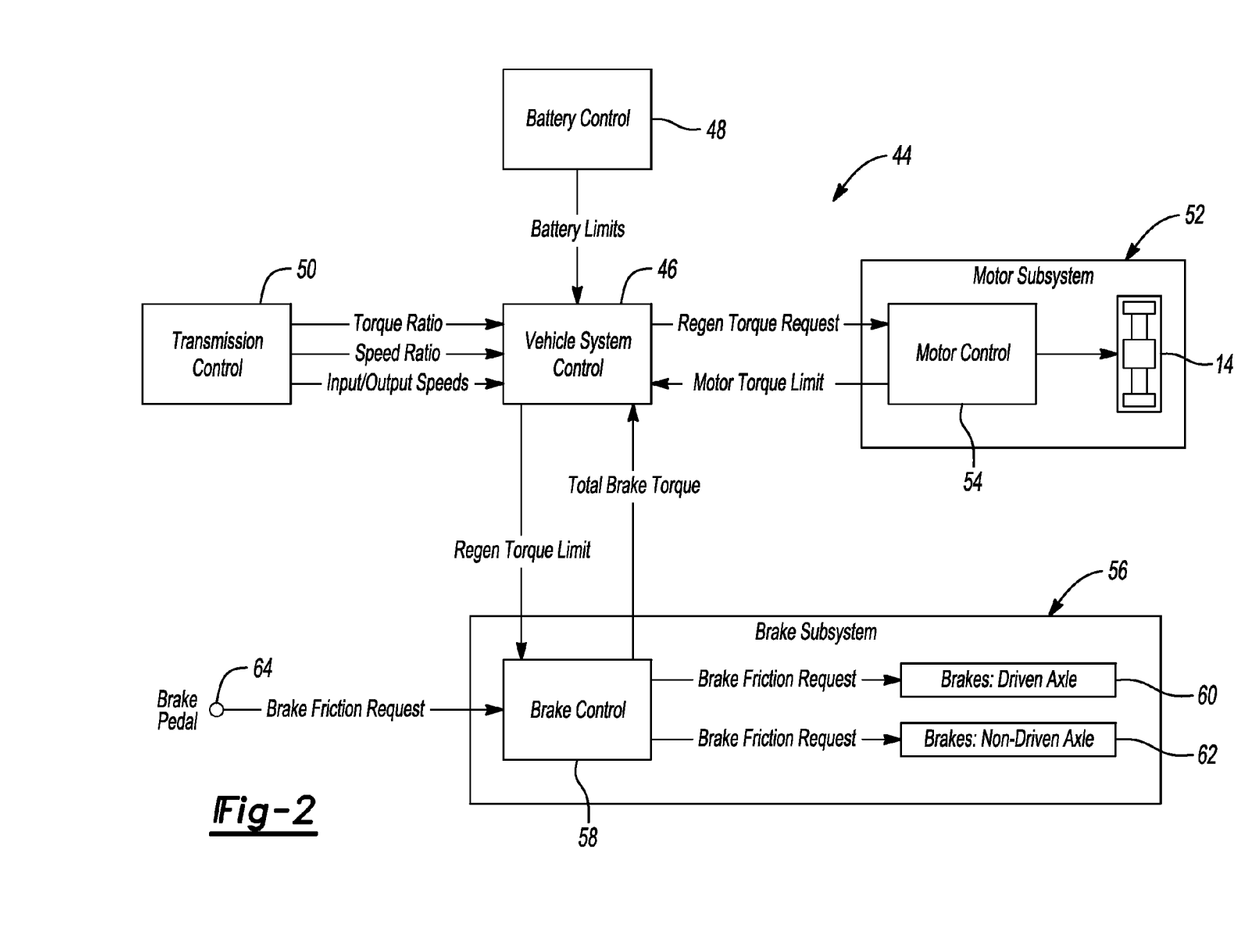
FIG. 2 is a schematic representation of a control system architecture in accordance with embodiments of the present invention.

FIG. 2 shows a schematic representation of a control system 44 in accordance with embodiments of the present invention. Shown in FIG. 2, is a vehicle system control 46, which may include a single vehicle system controller (VSC), or any number of individual hardware and software controllers connected to each other. In the embodiment illustrated in FIG. 2, the vehicle system control 46 sends and receives various signals to other controllers in the control system 44. This communication may occur, for example, over a controller area network (CAN). A battery control 48 provides as an input into the vehicle system control 46 certain battery limits, which may be useful for controlling the charging and discharging of the batteries 38, 40. A transmission control 50 provides torque and speed ratios, as well as input and output speeds to the vehicle system control 46. As discussed in more detail below, this may be important, for example, to determine how to control the wheel torque to avoid "torque holes" or other driveline disturbances during a transmission gear shift.

Also shown in FIG. 2, is a motor subsystem 52, which includes the motor 14 and a motor control 54. Among other things, the motor controller 54 receives a regenerative torque request from the vehicle system controller 46, and provides motor torque limits back to the vehicle system controller 46. A brake subsystem 56 includes a brake control 58, which communicates with brakes 60 on the driven axle—see the axle 28 in FIG. 1—and also communicates with brakes 62 on the non-driven axle. Communicating with the vehicle system controller 46, the brake controller 58 outputs total brake torque and receives regenerative torque limits. Finally, a brake pedal 64 is shown providing a brake request to the brake controller 58. Although certain inputs and outputs are illustrated in the schematic diagram shown in FIG. 2, it is understood that other signals and information can be communicated between some or all of the controllers illustrated in the control system 44. In addition, some vehicles may include a different configuration of controllers while still providing the system management for implementing methods in accordance with embodiments of the present invention.

As described above, embodiments of the present invention include a system and method for controlling a transmission gear shift during a braking event in a vehicle, such as the vehicle 10 illustrated in FIG. 1. More particularly, embodiments of the invention may provide a mechanism for reducing or eliminating torque holes or other driveline disturbances resulting from a transmission gear shift. With reference to the vehicle 10 shown in FIG. 1, and the control system 44 shown in FIG. 2, various examples are now described. A braking event for the vehicle 10 may include the use of friction brakes, regenerative braking, or both. As the speed of the vehicle 10 is reduced as a result of braking, a transmission gear shift may occur; in particular, this may be a downshift from a higher gear to a lower gear. In the case where the engine 12 is operating, it may be possible to control the engine to avoid any driveline disturbances resulting from the downshift; however, when the disconnect clutch 16 is open and the engine 12 is not operating, other systems and methods must be employed.

The transmission gear shift—i.e., in this case the downshift—may provide a torque hole or other driveline disturbances based a on a number of factors. For example, the gear ratio change in a step-ratio transmission such as the transmission gearbox 24 may result in a noticeable reduction in wheel torque at the drive wheels 34, 36. Embodiments of the present invention may reduce the friction braking to increase the wheel torque to compensate for the reduction in wheel torque that results from the change in the gear ratio. As explained in more detail in conjunction with FIG. 3, the reduction in friction braking may be based at least in part on this reduction in wheel torque that results from the change in the gear ratio.

The differential gearing 26 defines an axle ratio, which may be, for example, the ratio of the output torque from the transmission gearbox 24 to the output torque from the differential gearing 26—i.e., ($t_{out}$)/($t_{final}$). This axle ratio may also affect the reduction in wheel torque that occurs during the transmission gear shift. Similarly, frictional losses in the transmission gearbox 24 and the differential gearing 26 can also affect the wheel torque reduction during the transmission gear shift. Thus, there may be any number of factors that contribute to a reduction in wheel torque when the transmission is shifting gears, particularly during a downshift. As a result, the reduction in friction braking to increase the wheel torque may be based at least in part on the reduction in wheel torque resulting from: a change in the gear ratio, the axle ratio, frictional losses, or some combination thereof.

At least one controller, such as the brake controller 58, alone or in conjunction with the other controllers in the control system 44, may be used to effect a reduction in friction braking. Friction braking may be reduced at the brakes 60 associated with the driven axle 28, at the brakes 62 associated with the non-driven axle, or both. The reduction in friction braking may be controlled to increase the wheel torque during a braking event by an amount that is no greater than a reduction in the wheel torque resulting from the transmission gear shift, which as explained in detail above may result from a number of contributing factors.

In some cases, the friction braking may be reduced to a level that results in an increase in wheel torque that is generally equal to the reduction in the wheel torque resulting from the transmission gear shift. When this occurs, the level of regenerative braking that is occurring is maintained throughout the braking event. As used in the previous sentence, the regenerative braking being "maintained" does not necessarily mean that it is held constant, but rather, that it is controlled without regard to wheel torque compensation resulting from the transmission gear shift, and this may or may not include holding the regenerative braking constant. In other cases, it may not be possible or desirable to reduce the friction braking to fully compensate for the reduction in wheel torque caused by the transmission gear shift. In such cases, the regenerative braking may also be reduced to further increase the wheel torque to compensate for the reduction in wheel torque caused by the transmission gear shift. In terms of vehicle systems, the motor 14 can be operated to increase the wheel torque such that a sum of the increase in wheel torque resulting from reducing the friction braking and the increase in the wheel torque resulting from operating the motor 14 is generally equal to the reduction in wheel torque resulting from the transmission gear shift.

Figure 3A:
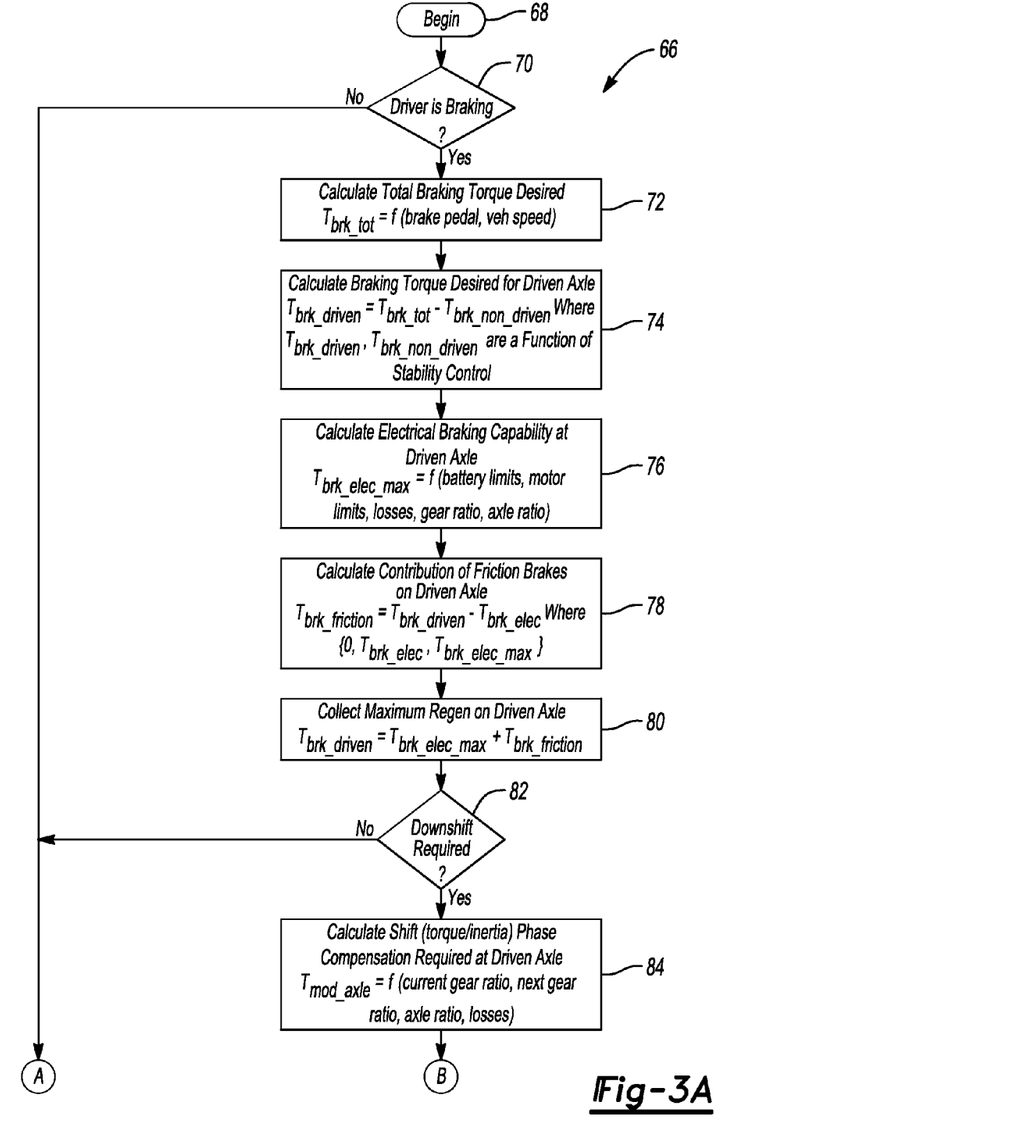
FIG. 3 is a flowchart illustrating a control system and method in accordance with embodiments of the present invention.
Figure 3B:
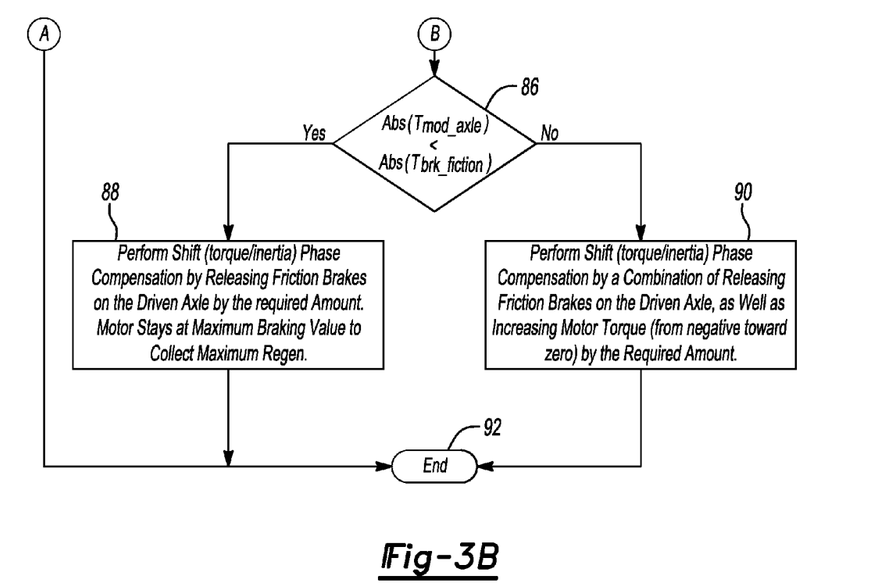

FIG. 3 shows a flowchart 66 illustrating a method in accordance with embodiments of the present invention. As described above, such a method may be executed, for example, by one or more of the controllers in a control system, such as the control system 44 shown in FIG. 2. The method begins at step 68, and at step 70 a decision is made as to whether a braking event is occurring. If it is, the method proceeds to step 72. At step 72 a total braking torque desired is calculated. As noted in the flowchart 66, this may be, for example, a function of an input from the brake pedal 64 and the vehicle speed. In the embodiment shown in FIG. 3, the method is applied only to the driven axle 28 of the vehicle 10, although as noted above, it can also or alternatively be applied to the non-driven axle.

At step 74, the braking torque desired for the driven axle is calculated, for example, by taking the difference between the total braking torque desired, as calculated in step 72, and the braking torque of the non-driven axle. As noted in the flowchart 66, the braking torques of the driven and non-driven axles are a function of stability control. A stability control system may take into consideration any of a number of variables, such as the speed of the vehicle, the weight and weight distribution of the vehicle, the coefficient of friction of the road surface, etc. At step 76, the electrical braking capability at the driven axle is calculated. This may be, for example, a function of battery limits, motor limits, electrical losses, gear ratio, axle ratio etc. More specifically, if a battery such as the high-voltage battery 38 is at a low SOC, the electrical, or regenerative braking capability may be higher than when the SOC is already very near its high limit. Similarly, electrical losses in the power electronics and other motor controls may at least in part dictate the electrical braking capability on the driven axle. The gear ratio, for example, in the transmission gearbox 24, and the axle ratio discussed above, may also be a factor in determining the electrical braking capability.

The method then moves to step 78, where the contribution of the friction brakes on the driven axle is calculated. As shown in the flowchart 66, one way to calculate the contribution of the friction brakes is to take the difference between braking torque desired for the driven axle as calculated in step 74 and the electrical braking torque. As noted at step 78, the electrical braking torque is a value between zero and the electrical braking capability as calculated in step 76, and it may be controlled by controlling the motor 14 during the braking event. Because it is often desirable to collect the maximum amount of regenerative braking torque available, step 80 is included, and may be calculated by adding the maximum amount of electrical braking torque to the contribution of the friction brakes to the braking torque.

At decision block 82, it is determined whether a downshift is required. If it is, the method moves to step 84 where a calculation is made of the shift (torque/inertia) phase compensation at the driven axle. The shift phase compensation was described above in terms of reducing braking to increase the wheel torque to compensate for the reduction in wheel torque that resulted from the transmission gear shift. As noted at step 84, the shift phase compensation ($T_{mod\_axle}$) may be defined in terms of a torque value, and may be, for example, a function of a number of parameters, including the current gear ratio, the next gear ratio, the axle ratio and frictional losses as described above.

At decision block 86, a determination is made as to whether the absolute value of the shift phase compensation (torque) calculated at step 84 is less than the absolute value of the friction braking torque, for example, as calculated in step 78. If it is, then the method moves to step 88, where the shift phase compensation is performed by releasing the friction brakes on the driven axle by the required amount. As described above, the regenerative braking is then maintained throughout the braking event. This may include, for example operating the motor to stay at a maximum braking value to collect the maximum amount of regenerative braking energy. If the alternative is true at decision block 86—i.e., the desired amount of modification to the wheel torque is not available exclusively from friction braking torque, then the method moves to step 90, where both the friction brakes and the regenerative braking are reduced so that the combination increases the wheel torque by the desired amount. After step 88 or step 90, the method ends at step 92. It is worth noting that if there was no downshift required at step 82, or if there was no braking event occurring at step 70, the method also moves to the end at step 92.

Figure 4:
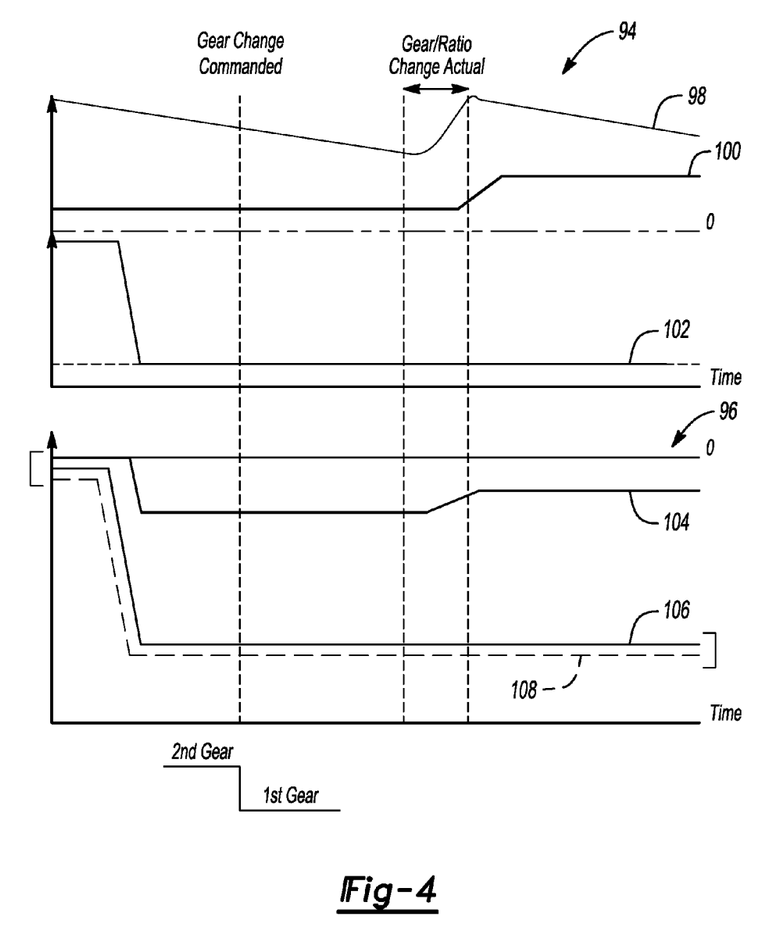
FIG. 4 is a graph illustrating the change in various vehicle parameters, wherein the vehicle includes a control system implementing a method in accordance with embodiments of the present invention.

FIG. 4 illustrates two graphs 94, 96, each of which illustrates different parameters related to implementation of at least some embodiments of the present invention. As illustrated in the graphs 94, 96, the first vertical line represents the point at which a gear change has been commanded. In the example, the gear change is a downshift from second gear to first gear. The next two vertical lines define a range where the gear ratio change is actually taking place. Although it appears from the graphs that the gear ratio change occurs quite some time after the gear change has been commanded, in fact, the graphs are merely spread out along the timeline for clarity. The actual time from a gear change command to when the gear ratio change is complete may be, for example, on the order of 800 milliseconds.

The uppermost curve 98 in the graph 94 illustrates the speed of the input shaft ($\omega_{in}$) of the transmission gearbox 24. As shown by the curve 98, the input speed gradually reduces until the actual gear ratio change begins to occur, after which time it increases throughout the rest of the range, until it begins to gradually reduce again after the gear ratio change is complete. In contrast, the transmission torque ratio, illustrated by curve 100, remains essentially constant until the gear ratio change is almost complete, and then it increases and becomes constant again after the increase. The transmission torque ratio change lags behind the change in speed of the input shaft as illustrated in curve 98. The curve 102 represents the torque at the motor input shaft, which is indicative of the amount of regenerative braking. As shown to the left of the graph 94, the motor torque is initially near zero, but once the brakes are applied the torque becomes very negative, indicating that a great deal of regenerative braking energy is being captured. At some point, the amount of regenerative braking reaches its limit, which is indicated by the curve 102 becoming horizontal and remaining constant.

The curves illustrated in graph 96 include the curve 104, which represents the amount of friction braking torque change that is implemented to control the torque hole or other driveline disturbance caused by the shift change. The curve 106 represents a braking torque request as seen by the drive wheels, and the curve 108 represents the actual wheel torque, which may be, for example, the sum of the motor torque times a transmission ratio plus the friction braking torque. Although the curves 104, 106, 108 are separated for clarity, it should be noted that all three begin at zero torque when they start at the vertical axis. Although the curve 104 soon deviates from the curves 106, 108, the curves 106, 108 are actually coincident throughout the entire time range illustrated in the graph 96.

As shown in the graph 96, the actual wheel torque matches the braking torque request, which helps to control the vehicle in a manner that the vehicle operator would expect. More importantly, perhaps, for purposes of driving comfort, is that the curve 108 remains constant throughout the time from when the gear change is commanded, and through the range of the actual gear change. This is facilitated by the reduction in friction braking torque during the actual gear ratio change as illustrated by the curve 104. If the friction braking was not reduced to provide an increase in wheel torque to offset the reduction in wheel torque caused by the gear ratio change, the curve 108 would not remain constant; rather, it would decrease throughout at least a portion of the gear ratio change before settling back to a constant level after the change was complete—i.e., it would show a "torque hole" in the wheel torque as described above.

Manipulation of the friction braking as described herein, and as generally illustrated by the curve 104, helps to ensure that this torque hole does not occur. Another advantage of controlling the friction braking in this manner is that the maximum amount of regenerative braking can continue to be captured, at least in some circumstances, as illustrated by the curve 102. Thus, embodiments of the present invention can help to reduce or eliminate driveline disturbances caused by a transmission gear shift without sacrificing the fuel economy of capturing the maximum amount of regenerative braking energy available.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a transmission gear shift during a braking event in a vehicle having an electric motor and friction brakes both operable to brake the vehicle, comprising:
   reducing friction braking to increase wheel torque during the braking event which includes both friction and regenerative braking based at least in part on a reduction in the wheel torque resulting from a change in gear ratio of a step-ratio transmission during the transmission gear shift.

2. The method of claim 1, further comprising reducing the regenerative braking to increase the wheel torque during the braking event when the step of reducing the friction braking does not increase the wheel torque by at least a reduction in wheel torque resulting from the transmission gear shift.

3. The method of claim 1, further comprising maintaining a level of the regenerative braking throughout the braking event when the step of reducing the friction braking increases the wheel torque by at least a reduction in wheel torque resulting from the transmission gear shift.

4. The method of claim 1, wherein the vehicle includes differential gearing on at least one axle, and the step of reducing the friction braking is further based at least in part on a reduction in the wheel torque resulting from an axle ratio defined by the differential gearing.

5. The method of claim 4, wherein the step of reducing the friction braking is further based at least in part on a reduction in the wheel torque resulting from frictional losses in the transmission and the differential gearing.

6. The method of claim 1 wherein the vehicle includes a driven axle and a non-driven axle, and wherein the step of reducing the friction braking to increase wheel torque includes reducing the friction braking at the driven axle only.

7. A method for controlling a transmission gear shift during a braking event in a vehicle having an electric motor and friction brakes both operable to brake the vehicle, comprising:
   reducing friction braking on at least one axle of the vehicle to a level to effect an increase in wheel torque during the braking event by an amount generally equal to a reduction in the wheel torque resulting from the transmission gear shift.

8. The method of claim 7, further comprising operating the motor to increase the wheel torque during the braking event.

9. The method of claim 8, wherein operating the motor to increase the wheel torque includes reducing regenerative braking of the vehicle.

10. The method of claim 7, wherein the vehicle includes differential gearing on at least one axle, and the reduction in the wheel torque resulting from the transmission gear shift is at least in part caused by at least one of: a change in a gear ratio in the transmission, an axle ratio defined by the differential gearing, or frictional losses in the transmission and the differential gearing.

11. The method of claim 7, wherein the vehicle includes a driven axle and a non-driven axle, and wherein the friction braking is reduced at the driven axle only.

12. The method of claim 7, further comprising reducing a level of regenerative braking when reducing the friction braking increases the wheel torque by only a portion of the reduction in wheel torque resulting from the transmission gear shift.

13. A system for controlling a transmission gear shift during a braking event in a vehicle having an electric motor and friction brakes both operable to brake the vehicle, comprising:
   a control system including at least one controller configured to reduce friction braking to increase wheel torque during the braking event based at least in part on a reduction in the wheel torque resulting from a change in gear ratio during the transmission gear shift.

14. The system of claim 13, wherein the at least one controller is further configured to reduce regenerative braking to increase the wheel torque during the braking event when the at least one controller acting to reduce the friction braking does not increase the wheel torque by at least a reduction in wheel torque resulting from the transmission gear shift.

15. The system of claim 13, wherein the at least one controller is further configured to maintain a level of regenerative braking throughout the braking event when the at least one controller acting to reduce the friction braking increases the wheel torque by at least a reduction in wheel torque resulting from the transmission gear shift.

16. The system of claim 13, wherein the vehicle includes differential gearing on at least one axle, and the at least one controller is further configured to reduce the friction braking during the braking event based at least in part on a reduction in the wheel torque resulting from an axle ratio defined by the differential gearing.

17. The system of claim 16, wherein the at least one controller is further configured to reduce the friction braking during the braking event based at least in part on a reduction in the wheel torque resulting from frictional losses in the transmission and the differential gearing.

18. The system of claim 13 wherein the vehicle includes a driven axle and a non-driven axle, and wherein the at least one controller is configured to reduce the friction braking to increase wheel torque during the braking event at the driven axle only.

\* \* \* \* \*